United States Patent [19]

Asano et al.

[11] 4,176,306
[45] Nov. 27, 1979

[54] SPEED CONTROL APPARATUS

[75] Inventors: Tetsumasa Asano; Osamu Yatsuki; Kazuyuki Fujimoto; Harutoshi Hashimoto, all of Himeji, Japan

[73] Assignee: Mitsubishi Denki Kabushiki Kaisha, Tokyo, Japan

[21] Appl. No.: 900,664

[22] Filed: Apr. 27, 1978

Related U.S. Application Data

[63] Continuation of Ser. No. 643,926, Dec. 23, 1975, abandoned.

[30] Foreign Application Priority Data

Dec. 27, 1974 [JP] Japan .................................. 49-2613
Jan. 24, 1975 [JP] Japan .................................. 50-10792
Feb. 20, 1975 [JP] Japan .................................. 50-21598
Feb. 21, 1975 [JP] Japan .................................. 50-22031
Mar. 7, 1975 [JP] Japan .................................. 50-28196

[51] Int. Cl.² ............................................. H02P 5/40
[52] U.S. Cl. ...................................... 318/772; 318/809
[58] Field of Search .......................... 318/227, 230, 231

[56] References Cited

U.S. PATENT DOCUMENTS

| | | | |
|---|---|---|---|
| 3,703,672 | 11/1972 | Bird et al. | 318/227 |
| 3,798,519 | 3/1974 | Habisohn | 318/227 X |
| 4,070,605 | 1/1978 | Hoeppner | 318/227 |

Primary Examiner—Gene Z. Rubinson
Attorney, Agent, or Firm—Oblon, Fisher, Spivak, McClelland & Maier

[57] ABSTRACT

A speed control apparatus includes a plurality of switches disposed between a three phase AC power source and a motor, a low speed control device for feeding power having a frequency lower than the frequency of the power source to the motor under the turn-on control of the switches, and a phase shifting device for shifting the phase order for changing from high speed operation to low speed operation of the motor.

3 Claims, 24 Drawing Figures

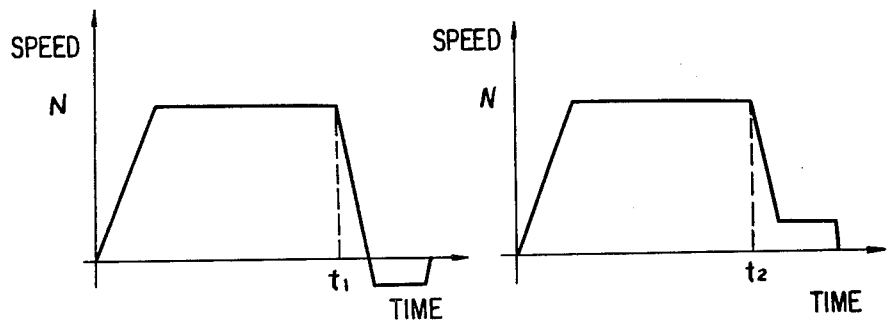
FIG. 17a
FIG. 17b
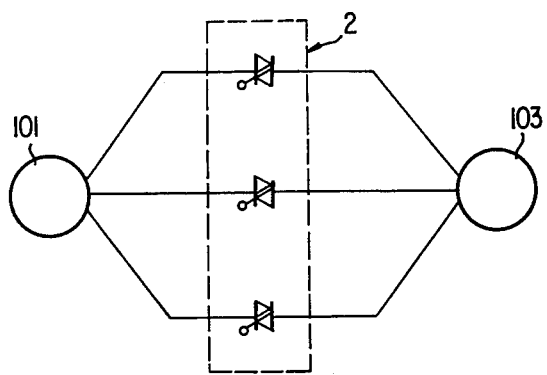
FIG. 18
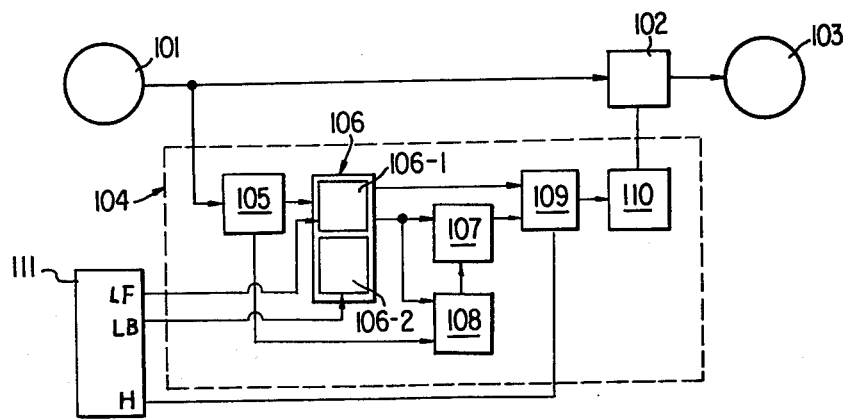
FIG. 19

SPEED CONTROL APPARATUS

This is a continuation of application Ser. No. 643,926, filed Dec. 23, 1975 and now abandoned.

BACKGROUND OF THE INVENTION

The present invention relates to a high-low speed two step speed control apparatus for an AC motor which is suitable for stopping a load operated by the AC motor at a predetermined position. More particularly, it relates to a speed control circuit which easily changes from high speed operation to low speed operation in the AC motor for low speed operation under low frequency output given by the phase control using thyristors.

There has been proposed a system for obtaining approximate low frequency outputs with partial deletion of wave forms of an AC power source by using thyristors. In this system, it is difficult to change from full speed operation to low speed operation without inserting a smoothing reactor having a high capacity depending upon the motor because of the high frequency components in the low frequency output. In particular, when the load of the AC motor is light, the full speed rotation of the motor is maintained even though a low speed mode is given.

The inventors have found that the above-mentioned difficulty can be overcome by exchanging the order of phases to the full speed operation in the low speed operation. A purpose of the present invention is to eliminate the need for synchronization under this condition. Another aim of the invention is to provide braking control apparatus for rapidly stopping a motor such as a three-phase cage type induction motor by feeding DC current to the primary windings and for accurately stopping the motor in a relatively low speed operation under speed control by a predetermined frequency by using switches such as thyristors, transistors, etc.

In general, in order to control the stop position for a machine operated by a motor, it has been proposed that the speed reducing operation be fluctuated after the high speed operation is corrected in low speed operation and to then suddenly stop the motor. It is known to conduct a low speed operation with frequency control of an AC motor. On the other hand, it is also known to suddenly stop the motor by applying DC voltage to the primary windings of the AC motor instead of the AC voltage.

However, in the conventional DC excitation braking operation, DC voltage is applied to a desirable one phase or two phases of a three phase induction motor without any consideration of selection of phases. The invention concerns the selection of phases for applying DC voltage in order to improve accuracy in stopping the motor. The selection is dependent upon the phase and the polarity of the voltage applied at the moment just before the initiation of DC braking operation.

Thus, a purpose of the invention is to provide a speed control apparatus for an AC motor using frequency control. More particularly, it relates to a speed control apparatus for accomplishing stable high-low two step speed operation at high efficiency by the partial deletion of the phases of the commercial AC power source.

In general, there is a primary voltage control system using phase control and a frequency control system using an inverter as a speed control system for an induction motor by using control rectifiers such as thyristors. The former system has a simple structure in principle. However, feedback of speed is necessary and efficiency is low. The latter system can yield a stable speed without feedback of speed to operate at high efficiency. However, the apparatus is disadvantageously expensive.

Accordingly, it is considered to realize low speed operation by obtaining low frequency current using partial deletion of the phases of a commercial AC power source in utilizations for inexpensive high-low two step speed operation without the requirement of continuous speed control such as a stop operation at a predetermined position for a conveyer, an electric truck, a turn-table and the like, a calculating machine, a stepping machine, a screw conveyer, a constant volume control and for constant distant movements of various automatic assembling machines.

In these control apparatus, the turn-on control of the control rectifiers is conducted so as to apply the interphase voltage of the AC power source by selecting in a predetermined order the interphase corresponding to the motor. In the conventional apparatus, the output signals of the control apparatus are prevented until the synchronizing condition is accomplished between the phase of the AC power source and the predetermined selected signal of the control apparatus after the connection of the power source. In some instances, uncontrolled signals are fed out.

The invention provides a control apparatus of a motor for outputting normal signals at the time connection is made to the power source without these disadvantages.

Moreover, it is known to conduct a low speed operation by converting frequency applied to the AC motor under a control using thyristors. The control modes of the control apparatus include ① a mode for full speed operation during turn-on of the thyristors; ② a mode for low speed operation under the control of turn-on of the thyristors and ③ a mode for braking the operation with a DC output using turn-on of a thyristor disposed in one specific phase to one direction.

In general, it is necessary to have means for receiving a mode change command given from the outer part of the control apparatus and electrical insulation between the control apparatus. A purpose of the invention is to provide a speed control apparatus which can receive an effective mode change command for applications for the modes ① and ② or modes ② and ③ or modes ①② and ③. The invention also relates to a speed control apparatus for the AC motor.

The conventional speed control apparatus include mechanical gears and a polarity change motor or an NC motor. However, the first and second type of apparatus have disadvantages in that they require a large and complicated structure of large volume. The second and third apparatus have the disadvantage of an expensive cost. An aim of the invention is to provide small size and inexpensive speed control apparatus which can be combined with the usual AC motor.

SUMMARY OF THE INVENTION

The foregoing and other objects are attained in accordance with one aspect of the present invention through the provision of a speed control apparatus comprising a plurality of switches disposed between a three phase AC power source and a motor; a low speed control device for feeding power having a frequency lower than the frequency of the power source to the motor under the turn-on control of the switches, and a phase shifting device for shifting the phase order for changing from high speed operation to low speed operation of the motor.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIGS. 17(a), (b) is a graph for showing the pattern of the speed control apparatus;

FIG. 18 is a diagram of a main circuit of one embodiment of the speed control apparatus for the motor according to the invention;

FIG. 19 is a block diagram of a speed control apparatus of FIG. 18;

DETAILED DESCRIPTION OF THE PREFERRED EMBODIMENTS

A purpose of the present invention is to provide a high-low two step speed control apparatus for a motor which is suitable for stopping a load driven by an AC motor at a predetermined position. More particularly, a purpose of the invention is to provide a speed control circuit for easily switching from a high speed operation to a low speed operation by applying a low frequency output with phase control using thyristors.

Figure 1:
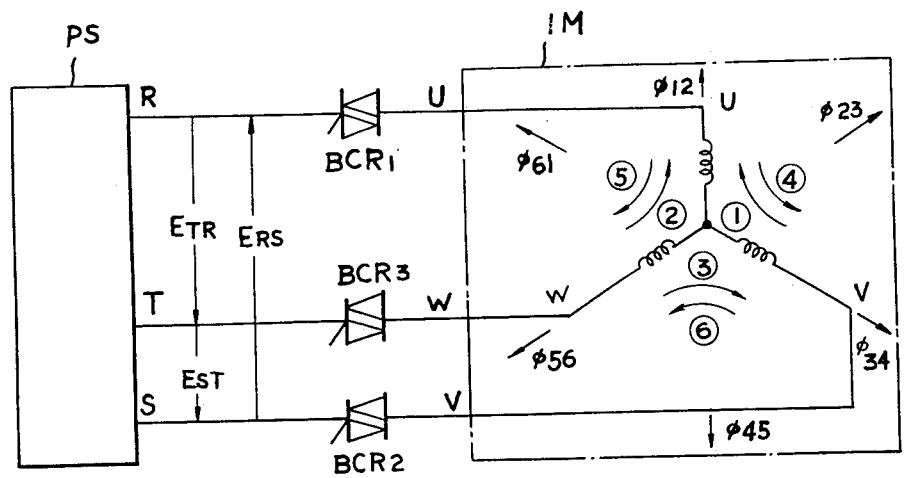
FIG. 1 is a diagram of a basic main power circuit according to the present invention.

Referring now to the drawings, wherein like reference numerals designate identical or corresponding parts throughout the several views, and more particularly to FIG. 1 thereof, FIG. 1 is a diagram of a basic power circuit for operating an induction motor according to the invention. In FIG. 1, the reference PS designates an AC power source for generating AC voltages $E_{RS}$, $E_{ST}$ and $E_{TR}$ having the wave forms shown in FIG. 2. The reference IM designates an induction motor such as a three phase squirrel-cage induction motor which is operated by the AC power source PS through switches $BCR_1$-$BCR_3$ such as two way thyristors.

Figure 2:
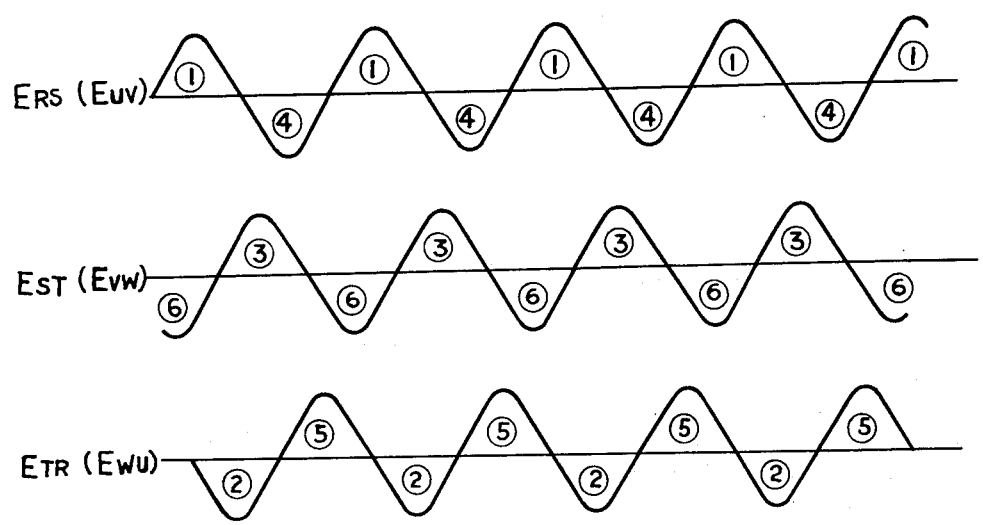
FIG. 2 is a diagram showing wave forms for power source of the circuit of FIG. 1.

The line voltages ①-⑥ having the polarities shown in FIG. 2 are applied to the input terminals U, V, W of the motor at the time the switches BCR are turned on. The line voltages ①-⑥ have the shape of the AC wave forms shown in FIG. 2. Accordingly, as shown in FIG. 1, there is sequentially generated magnetic flux $\phi$12 having wave forms ①②; magnetic flux $\phi$23 having wave form ③; magnetic flux $\phi$34 having wave forms ③, ④; magnetic flux $\phi$45 having wave forms ④,⑤; magnetic flux $\phi$56 having wave forms ⑤ ⑥; and magnetic flux $\phi$61 having wave forms ⑥ ① to form the rotating field.

Figure 3:
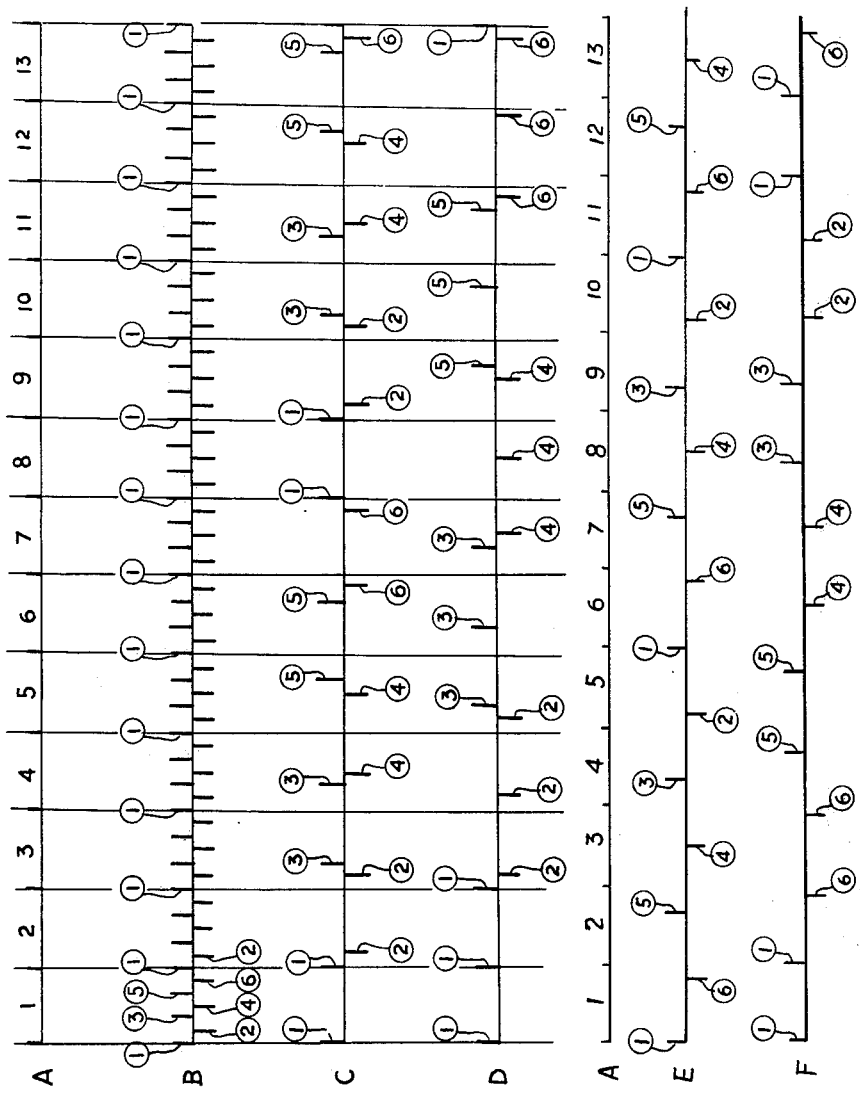
FIG. 3 is a diagram for illustrating low speed control.

FIG. 3 B shows the wave form sections ①-⑥ in one line in the order of generation. The cycles (one cycle is from the wave form section ① to ①) are shown in (A). When the motor is under full speed operation, the wave forms ①-⑥ should be applied to the motor. Thus, in the low speed operation, the order of the wave forms is constant and the basic wave forms ①-⑥ are deleted.

FIGS. 3 C, D show respectively diagrams for two or three continuous applications of the wave forms. In these cases, the wave form ① is found in 7th cycle of the 13th cycle to realize the rotating speed of 1/7 or 1/13.

FIGS. 3 E, F show respectively the diagrams for one or two continuous normal and reverse selection of the wave forms. In the selection of wave forms, the direction of the rotating magnetic field of low frequency output is reversed to give a rotation of 1/5 or 1/11.

Figure 4:
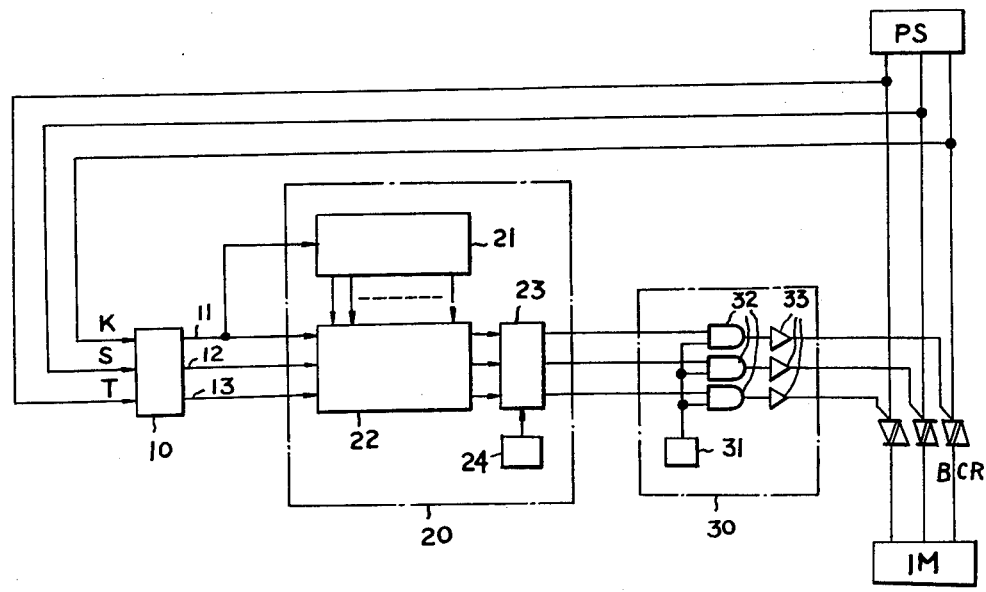
FIG. 4 is a diagram of one embodiment of a circuit for low speed control.

The structure of a control circuit based on the above-mentioned considerations is shown in FIG. 4 wherein the reference 10 designates a synchronizing signal generator which receives the power inputs R, S, T and which feed signal outputs synchronized to the frequency of the power source to the output lines 11, 12 and 13. For example, the synchronizing signal generator generates the output ⌐1⌐ to the output line 11 in the wave form ① and the output ⌐0⌐ to the output line 11 in the wave form ④ and the output ⌐1⌐ to the output line 12 in the wave forms ②, ⑤ and the output ⌐0⌐ to the output line 13 in the wave forms ③, ⑥. In practice, it is possible to generate logical outputs corresponding to ①-⑥ in sequence depending upon the frequency of the power source with one phase input among the power inputs R, S, T. The reference 20 designates a wave form selecting device which responds to the output of the synchronizing signal generator 10 and 21 designates a ring counter which is initially set to receive the signal from the output line 11 to generate 6n+1 outputs (n=natural number).

The outputs have the cycles in FIG. 3A except that the cycle is a repeat of 1-7 in the case of 1/7 and a repeat of 1-13 in the case of 1/13.

The reference 22 designates a logical operation circuit which receives outputs for cycles given by the ring counter 21 to generate a turn-on command for each phase. For example, in the sixth cycle at 1/13, the command output is applied to turn on BCR₃ and BCR₂ in the wave form ③ and the command output is not applied in the wave forms ①, ②, ④, ⑤, ⑥. The relationships are shown from the relationships of A, C; A, D; A, E and A, F. The relation between the wave form for application and the phase of BCR is shown in FIG. 1.

The reference 23 designates a turn-on control device which applies a turn-on command to all switches BCR₁–BCR₃ regardless of the output of the logical operation circuit 22 in the event that the full speed operation command is received from a mode switching command device 24 and applies the output of the logical operation circuit 22 with a delay in the event that the low speed operation command is received from the mode switching command device 24.

Accordingly, even though the turn-on command is applied from the logical operation circuit 22 at the generation of the wave form ③ in the low speed operation, the practical turn-on is realized after a certain time delay whereby a part of the wave form ③ is applied. The delay time in the turn-on control device 23 is not needed if the output timings of the output lines 11, 12, 13 are varied.

The reference 30 designates a turn-on device which comprises a pulse generator 31, a gate element 32 and a gate amplifier 33. The turn-on device 30 turns on a switch BCR₁₋₃ in the corresponding phase depending upon the turn-on command for each phase applied by the wave form selecting device.

In this embodiment, when the power source switch (not shown) is turned on to give a high speed command to the mode switching command device 24, all switches BCR₁–BCR₃ are turned on by the actuation of the turn-on device whereby the motor IM is connected to the AC power source PS to cause full speed operation. When the low speed command is applied from the mode switching comman device 24, the wave form is selected in the logical operation circuit 22 by the output of the synchronizing signal generator 10 and the output of the ring counter 21. As a result, the motor IM is operated at low speed. The current of the motor at low speed is controlled by the turn-on control device 23.

It is possible to realize DC excitation braking operation from the low speed condition by the turn-off of one switch and the turn-on of one switch and the one way turn-on of one switch of a three phase circuit. The mode switching command device 24 may have functions for these conditions.

The basic concept of frequency control using partial deletion according to the invention has been described above. Thus, the normal low speed mode in 1/7 or 1/13 and the reverse low speed mode in 1/4 or 1/11 can be realized by the controls. However, it should be considered that the switch from high speed operation to low speed operation (elimination of synchronization) is difficult because of the normal high speed mode in both the normal and reverse modes.

Figure 5:
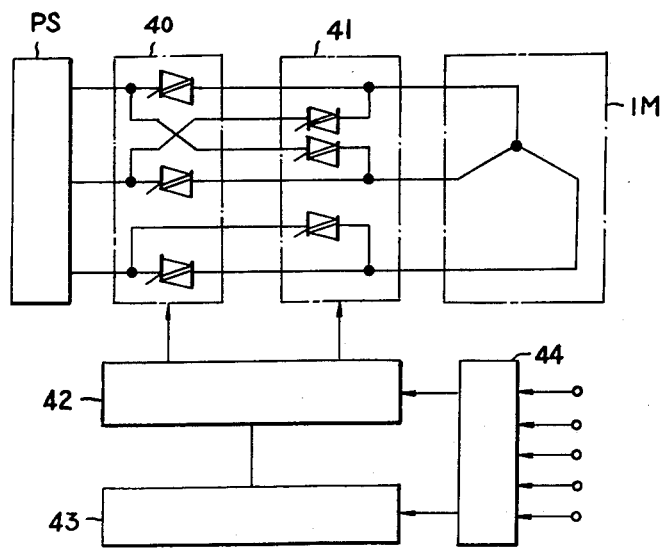
FIGS. 5, 6 and 7 are respectively diagrams of embodiments of the invention.
Figure 6:
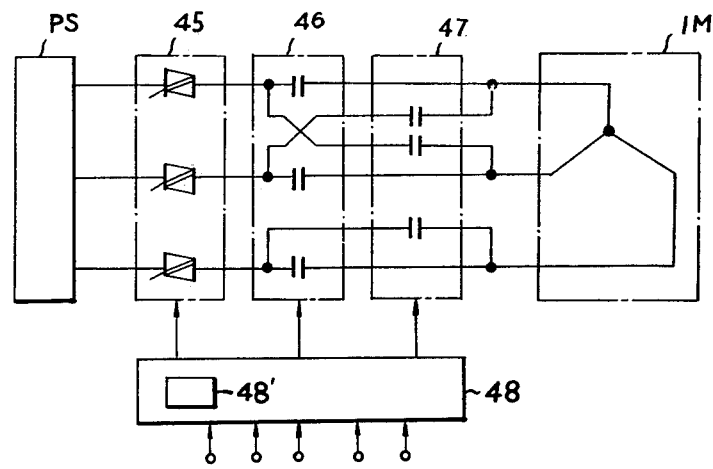
Figure 7:
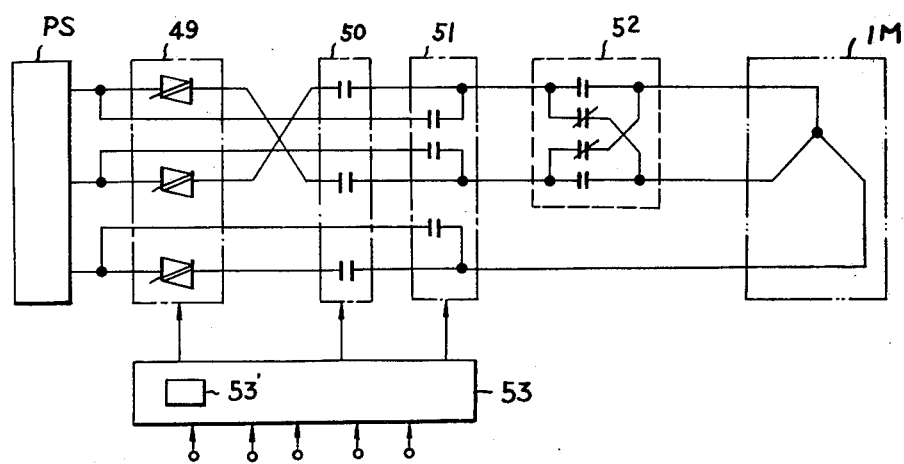

FIGS. 5–7 show the first to third embodiments of the invention for overcoming the above-mentioned problem. In FIG. 5, the reference 40 designates positive connection switches and 41 designates negative connection switches. Both are respectively connected in the phases of the three phase AC power source PS and the motor IM. The phase order of one is varied from that of the others.

The reference 42 designates a phase shifting device for switching to control either the switch 40 or 41; 43 designates a speed changing device for generating a turn-on pulse output which varies depending upon the selection of the high speed mode or the low speed mode; 44 designates a switching control device for controlling the phase shifting device 42 and the speed changing device 43 by receiving command inputs of high speed normal operation, high speed reverse operation, low speed normal operation, low speed reverse operation and stop. The switching control device actuates the devices upon the following conditions.

| Conditions | Switches | Selected mode |
|---|---|---|
| normal high speed initiation | positive connection | high speed full turn-on |
| normal high speed → normal low speed | negative connection | normal low speed |
| reverse high speed initiation | negative connection | high speed full turn-on |
| reverse high speed → reverse low speed | positive connection | reverse low speed |
| reverse high speed → normal low speed | positive connection | normal low speed |

As is clear from the above table, the phase order should be shifted and the direction of rotation in low speed operation is determined by the order of the phase of the switches and the selection of the normal mode or the reverse mode during the change from the high speed operation to the low speed operation. As a result, the high speed component in the low speed mode is always actuated to the reverse side whereby the synchronization is eliminated. When the synchronization is eliminated, stable low speed operation is attained because the high speed torque component is significantly lower than the low speed torque component.

Various cases can be considered in various applications in the control for stopping at a predetermined position. Two systems of one way control and two way control can be considered. Systems for reducing the speed from the high speed operation and stopping after correcting the shortage by low speed operation in the same direction or after correcting the overrun by low speed operation in the reverse direction can be also considered. In the applications for determining the speed reducing position to correct the shortage by low speed operation in the same direction, only the reverse low speed mode is needed and the normal low speed mode is not necessary.

In the embodiment of FIG. 6, the switching operation for a positive phase or for a negative phase is achieved by the contact points. In FIG. 6, the reference 45 designates switches for full turn-on or selective turn-on under partial deletion control in the condition of high or low speed operation; 46 designates positive phase connection contactors, 47 designates negative phase connection contactors; and 48 designates a switch control apparatus comprising a low speed control device 48'.

The switches 45 are fully turned on by the high speed command. The switches 45 are selectively turned on by the low speed command. When there is a switchover from the high speed operation to the low speed operation, the contactors 46 and 47 are switched.

In the embodiment of FIG. 7, the switch 49 is used only during the low speed operation. In FIG. 7, the reference 50 designates a negative phase contactor for contact during the low speed operation; 51 designates a positive phase contactor for contact at the high speed operation; 52 designates a contactor for reversible operation; and 53 designates a switch control apparatus comprising a low speed control device 53'.

In this embodiment, the high speed operation is directly conducted by contacting the contactor 51 without actuation of the switch 49. The direction is decided by the condition of the contactor for reversible operation 52. During low speed operation, the contactor 50 is connected instead of the contactor 51 and the low speed operation can be conducted by selective turn-on of the switches 49. Accordingly, the switches 49 can have a short time rating and a small capacity.

As is clear from the above-mentioned illustration, in accordance with the embodiments of the invention, the automatic speed change can be attained without braking apparatus by negative phase connection at the high-low speed change to eliminate synchronization in the apparatus for low speed operation by selective turn-on of the switches connected between the three phase AC power source and the motor.

Figure 8:
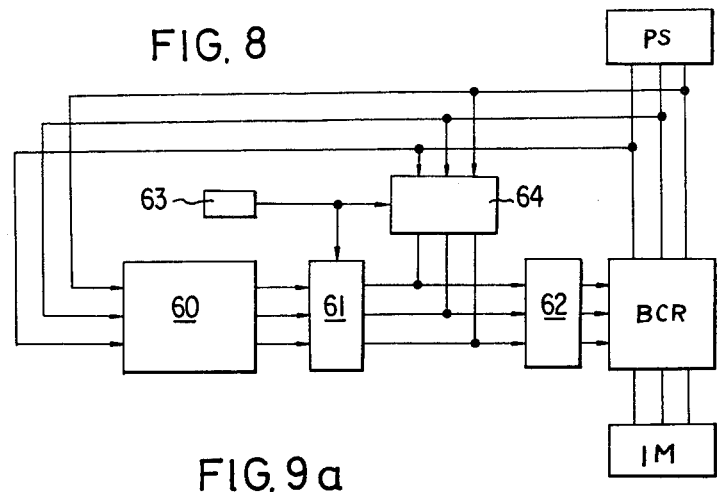
FIG. 8 is a diagram of one embodiment of a braking control apparatus of an AC motor of the invention.

The other embodiments of the invention will now be described. In FIG. 8, the reference 60 designates an alternating excitation turn-on control device which comprises a synchronizing signal generator and a turn-on selection device; 61 designates a memory device which feeds the output signal of the turn-on control device 60 to the turn-on device 62 in its normal state and which memorizes the state of the output of the turn-on control device 60 just before application when the braking command is applied from the braking command device 63; and 64 designates a DC excitation turn-on control device for applying the turn-on command to the turn-on device 62 to the phase generating output from the memory device 61.

The high-low speed operations of the motor IM can be conducted as stated above. When the braking command is applied by the braking command device 63 in low speed operation, a DC excitation is applied to the finally selected phase in the low speed operation in the embodiment of FIG. 5.

The meaning of this operation will be illustrated in the case of the positive mode at 1/7. The wave forms ①, ②, ③, ④, ⑤, ⑥ are sequentially applied to the AC motor IM at low speed operation whereby the positive low speed operation is conducted by the positive rotating magnetic field. For example, when the braking command is applied at the time of the wave form ④, only the wave form ④ is applied to the motor IM after application of the braking command.

As is clear from the above-mentioned case, in the wave form ④, the switch BCR for the R phase and the S phase is actuated to pass current from the S phase to the R phase and the T phase is quiescent whereby the braking operation is attained by the half wave pulse current.

When the phases for DC excitation braking operation are selected, six cases such as ① ② ③ ④ ④ ④ ..., ① ② ③ ④ ③ ③ ③..., etc., can be considered. In the latter case, the motor is in normal operation during the time of wave forms ① ② ③ ④ and the reverse rotating magnetic field is generated at the moment at the wave forms ④, ③, ③. Then, the DC excitation braking operation is conducted under the wave form ③.

As a result, the progressive angle after the braking command is quite small causing stoppage under a reverse rotation at a moment of low inertia load. When the low speed operation is conducted in the wave forms ①, ②, ③, ④ and the DC excitation braking operation is conducted at the wave form ⑤, correspondence is effected to the case of DC excitation at the wave form ⑤ after low speed operation in the wave forms ①, ②, ③, ④, ⑤. Accordingly, the progressive angle of 360/60=60° as the electrical angle is increased.

As stated above, in order to reduce the fluctuation of progress after applying the braking command output, the DC excitation is effected under selection of uniform wave forms before the initiation of the braking operation.

In FIG. 8, the selection of the same phase is conducted as a simple illustration. Thus, it is possible to select the reverse phase. In this embodiment, the case of obtaining low frequency from the AC power source by the control with partial deletion of the thyristors has been described. The case for obtaining low frequency from the DC power source using transistor choppers can be considered in a similar manner.

In accordance with the embodiment of the invention, the selection of the DC braking excitation phases can be commonly conducted depending upon the final selected phase in the low speed operation. Accordingly, a fluctuation of the progressive angles after applying the braking command output can be minimized.

The effect of the high-low speed change operation for improving the accuracy of the stop position can be further improved. Referring to FIGS. 9-14, the other embodiment of the invention will now be described.

Figure 9A:
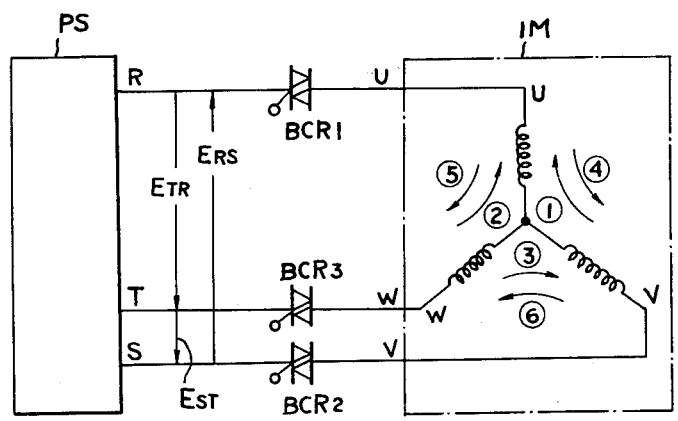
FIG. 9 is a diagram of a basic motor control apparatus according to the invention; wherein (a) is a main circuit; and (b) are wave forms of power source.

FIG. 9(a) shows the main circuit of the embodiment. In FIG. 9(a), the reference PS designates an AC power source for generating the AC voltages $E_{RS}$, $E_{ST}$, $E_{TR}$ having the wave forms shown in FIG. 9(b); IM designates an induction motor such as a three-phase cage type induction motor which is actuated by the AC power source PS through the switches $BCR_1$-$BCR_3$ such as two directional thyristors. The interphase voltages ①-⑥ are applied in the polarities shown in FIG. 9(b) to the input terminals U, V, W of the induction motor during the full turn-on of the switches BCR.

Figure 9B:
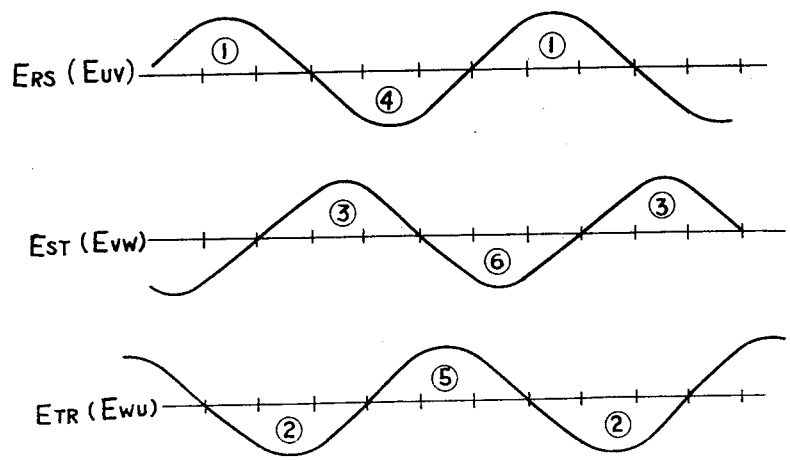
Figure 10:
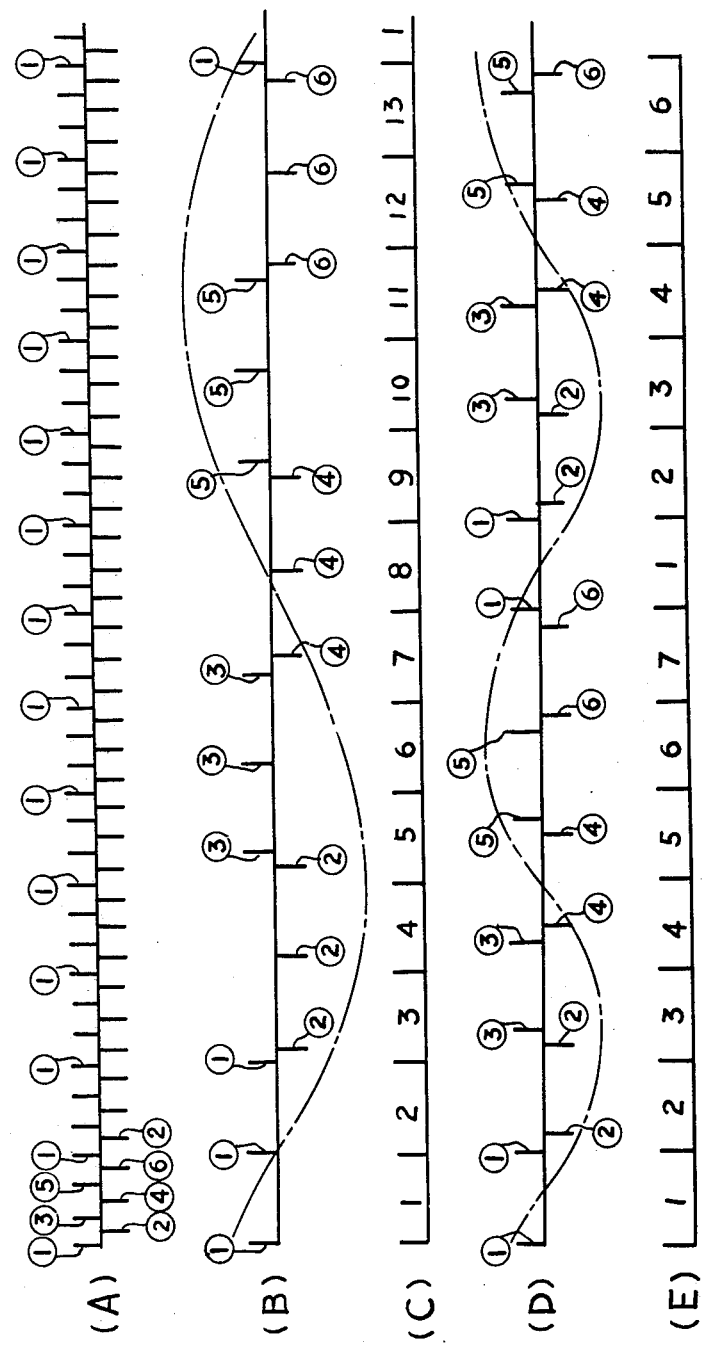
FIG. 10 is a graph showing the relationship between the frequency of the power source and the frequency decided by each selected phase.

As shown in FIG. 9(b), the interphase voltages ①-⑥ show the order of formation of the AC wave forms.

FIG. 10A shows the wave forms ①-⑥ in linear lines in order. The cycle numbers (the AC power source frequencies ①-⑥ in series are considered as one cycle) are shown in FIGS. 10C and E. In the full speed operation of the motor, all of the wave forms ①-⑥ are applied to the motor. In this embodiment, the order of the wave forms ①-⑥ is kept constant at the low speed operation and the wave forms ①-⑥ are respectively selected.

In FIGS. 10B and D, the wave forms are selected continuously three times or two times. The wave form ① is found in the 13th cycle (FIG. 10C) or in the 7th cycle (FIG. 10D). Accordingly, the frequency dividing ratio in these cases is 1/13 or 1/7. When the W phase voltage of the motor IM in FIG. 9(a) is considered, the positive voltage is applied by the wave forms ⑤ and ⑥ as shown in FIG. 9(a). Accordingly, the sine wave components shown by the chain lines in FIGS. 10B, D are applied to the motor. The same can be considered in the U phase and the V phase. It is possible to turn-on the control of the interphase voltage wave forms of the AC power source PS so as to apply the voltages corresponding to the output frequency to the motor depending upon the well-known characteristics of the induction motor.

Figure 11:
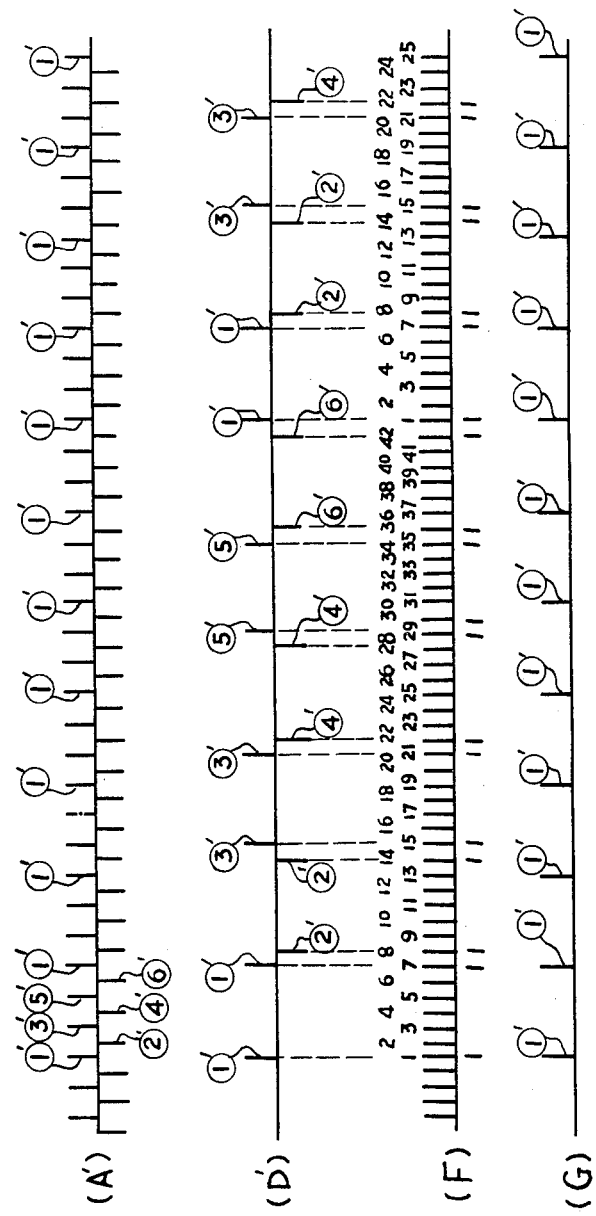
FIG. 11 is a time chart for illustrating the operation of the conventional apparatus.

Referring to FIG. 11, the operation of a conventional control circuit in the case for obtaining the output of the frequency dividing ratio of 1/7 of the AC power frequency (FIG. 10D) will be described. FIG. 11A' shows the signal for detecting the phases of the interphase voltages of the AC power source PS which correspond to FIG. 10A. FIG. 11D' shows the same type signal which corresponds to FIG. 10D. FIG. 11F shows the wave form realized by the logical sum of the phase detecting signals A' given in order for generating the interphase voltages of the AC power source.

When serial numbers are given from the signal corresponding to the left end ①' for the signal of FIG. 11D', one cycle of the signal D' is completed by 42th signal. It is found that the signals ①'-⑥' selected in the signal D' have specific correspondence to the numbers of logical sum signal trains of all signals ①'-⑥' in 1–42th of the signal F. For example, the 1st and 7th of the signal train F are for ①' of the signal D'. Accordingly, 1–42 outputs are included in the logical sum signal train F for the signals ①'-⑥' and input into a ring counter (not shown) which is reset at the output 42 and the outputs are applied to the switches $BCR_{1-3}$ under the above-mentioned relations. That is, the outputs 1, 7, 22, and 28 of the ring counter are applied to $BCR_1$ and $BCR_2$. The outputs 8, 14, 29 and 35 are applied to $BCR_1$ and $BCR_3$. The outputs 12, 15, 21, 36 and 42 are applied to $BCR_2$ and $BCR_3$.

In this conventional system, the operation of the ring counter should be synchronized to the interphase voltages of the AC power source (the counting is initiated from ① in FIG. 11). Accordingly, it is necessary to prevent the operation of the ring counter for the signals ②'-⑥' until application of the first signal ①'. In the conventional system, there is a disadvantage to having a nonoperational time (maximum one cycle of the AC power frequency) after the connection of the power source.

This embodiment of the invention will now be described. Seven cycles of the AC power source PS are needed for one cycle of the wave forms of FIG. 10D. In the wave forms of FIG. 10D, ① is selected only in the first cycles of FIG. 10E. In the third to seventh cycles, ① is not selected. Thus, ② is selected in the second and third cycles of FIG. 10D. A similar situation exists for ③-⑥. Accordingly, a ring counter for counting in each one cycle of the AC power source PS is reset at 7 (6n±1) and a matrix circuit for signals ①-⑥ are combined. The selected signal ①-⑥ is preliminarily decided in its output condition 1–7 of the ring counter.

Figure 12:
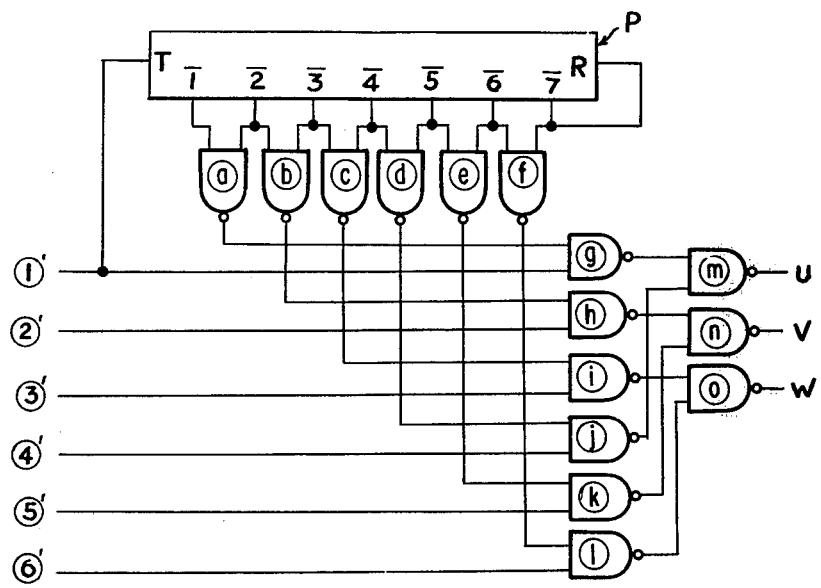
FIG. 12 is a block diagram of one embodiment of the apparatus of the invention.

The embodiment of this apparatus will now be described referring to FIGS. 12–14. In FIG. 12, the references ①'-⑥' designate signals for detecting the phases of the interphase voltage ①-⑥ of the AC power source. The wave forms are shown in FIG. 14 as ①'-⑥'. In FIG. 12, the reference P designates a ring counter which realizes outputs 1-7 and the count progresses by each signal ①'. The references ⓐ-ⓕ designate "and" circuits. For example, the "and" circuit ⓐ inputs 1 and 2 of the outputs of the ring counter; the "and" circuit ⓑ inputs 2 and 3; ⓒ inputs 3 and 4; ⓓ inputs 4 and 5; ⓔ inputs 5 and 6 and ⓕ inputs 6 and 7.

The outputs of the "and" circuits are shown in FIGS. 14g–l. The references ⓖ-ⓗ designate "and" circuits. For example, the "and" circuit ⓖ inputs the output of ⓐ and ①' and the output of the "and" circuit ⓖ is shown in FIG. 14m. The "and" circuits ⓗ-ⓛ are connected in a similar manner. The references ⓜ-ⓞ designate "and" circuits which respectively input two "and" circuits among the "and" circuits ⓖ-ⓛ which input ①'-⑥'.

In FIG. 12, the outputs of ⓖ and ⓙ are connected as the input of the "and" circuit ⓜ; the outputs ⓗ and ⓚ are connected as the input of the "and" circuit ⓜ; and the outputs ⓘ and ⓛ are connected as the input of the "and" circuit ⓞ.

The output wave forms of the "and" circuits ⓜ-ⓞ are shown in FIGS. 14n–p. The pairs of "or" signals of FIG. 14n–p are shown in FIGS. 14q–s. The signal trains q - s are applied to $BCR_{1-3}$.

Figure 13:
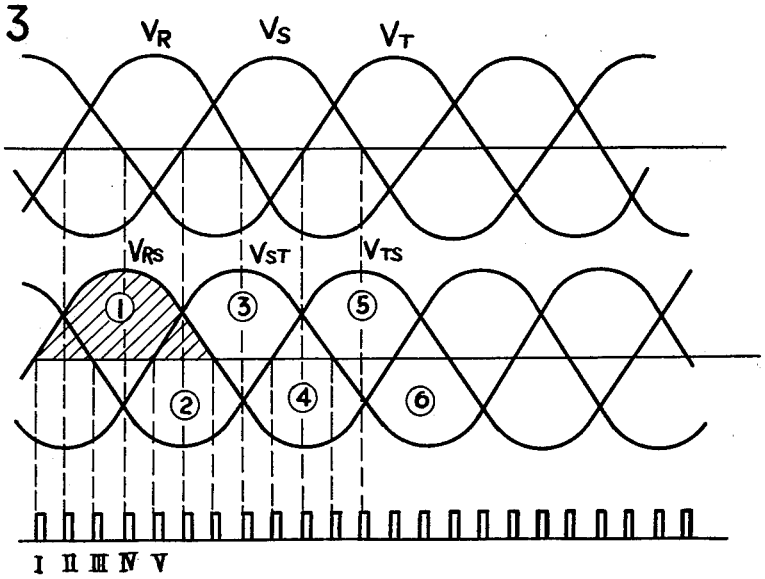
FIGS. 13 and 14 are respectively a graph and a time chart for illustrating the operation of the circuit of FIG. 12.
Figure 14:
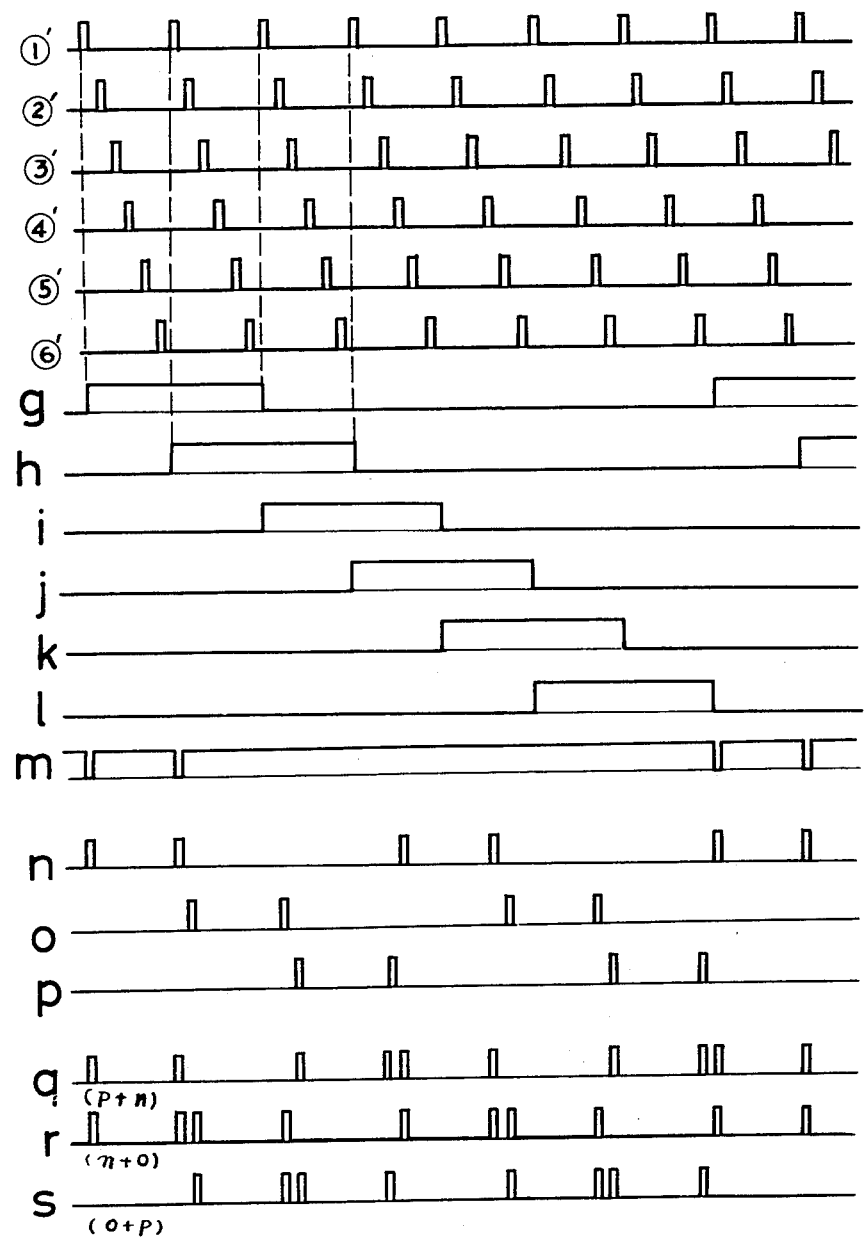

In FIG. 13, when the interphase voltage of the AC power source slant line part $V_{RS}$ is applied, in order to obtain a desirable voltage applied to the motor, any one of I–V in the section ① in the zero cross signals of the interphase voltage and phase voltage of the AC power source can be used as the ①' signal. It is also possible to obtain the ①' signal by various delay circuit outputs.

As stated above, in accordance with the embodiment of the invention, the signal selected is decided as the circuit in any output condition of the ring counter output condition of the ring counter P regardless of the conditions of ①'-⑥' of the phase detecting signal at the time just after the connection of the power source. Accordingly, the apparatus of the invention does not have the disadvantage of the conventional apparatus that the output of the apparatus cannot be realized until after stable operation of the circuit after the connection of the power source. Accordingly, the apparatus of the invention has the advantage that normal operation can always be maintained.

The above-mentioned embodiment is to realize 1/7 of the frequency dividing ratio. Thus, it is clear that realization of 6n±1 of the frequency dividing ratio can be considered in a similar manner.

The following embodiment of the invention is to provide a speed control apparatus which realizes an effective mode change command to the applications which need one of the following modes, as a control mode of the motor.

(1) a full speed operation mode by turn-on of all thyristors.

(2) a low speed operation mode by control of turn-on of the thyristors.

(3) a braking operation mode by a DC output using one way turn-on of a thyristor disposed in a specific phase.

The basic concept of the embodiment requires consideration of the characteristic that a synchronizing signal generator is needed in the control mode 2. However, it is not needed in the other modes 1, 3.

Figure 15:
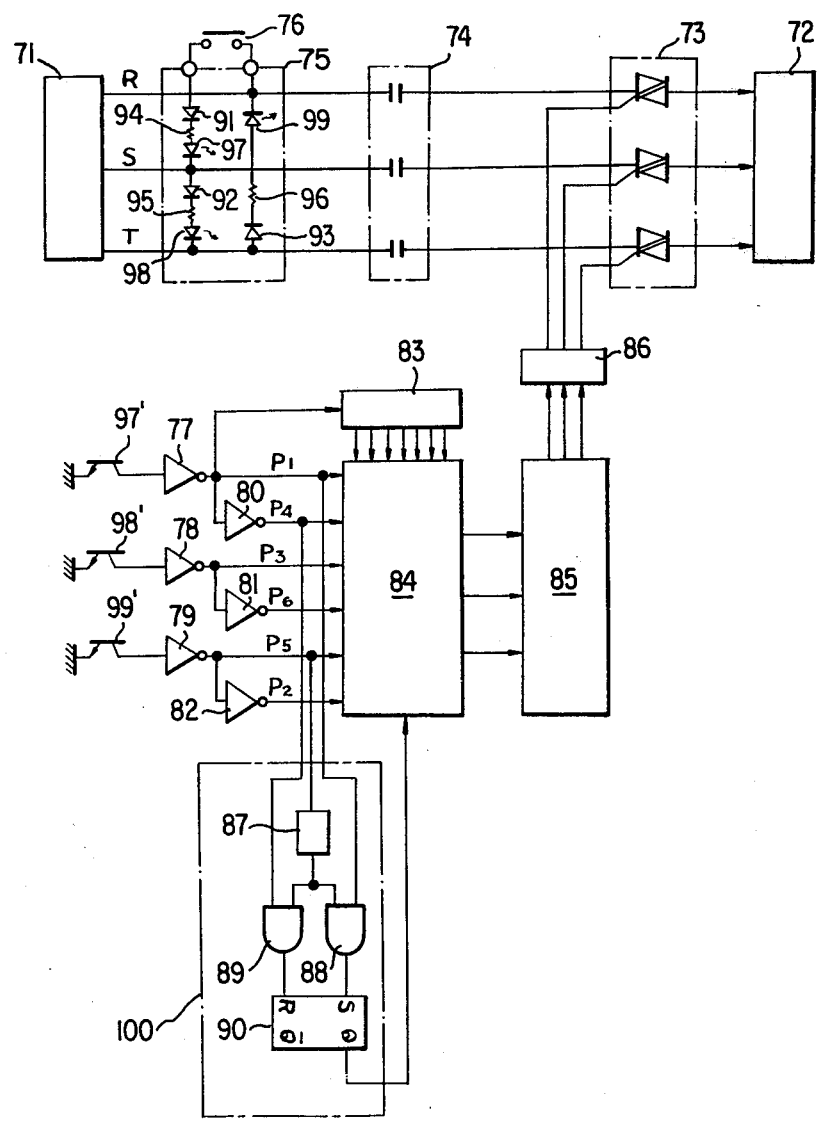
FIG. 15 is a diagram of one embodiment of a circuit of speed control apparatus for the invention.

Referring to FIG. 15, this embodiment will not be described. In FIG. 15 which shows the basic circuit, the reference 71 designates a three phase AC power source having the phases R, S, T; 72 designates an AC motor; 73 designates switches such as two way thyristors, reverse parallel thyristors or reverse turn-on thyristors; 74 designates a power source contactor; 75 designates synchronizing signal generators disposed between phases and the synchronizing signal generators comprise series diodes 91, 92, 93, series current limiting resistors 94, 95, 96 and photodiodes 97, 98, 99. One circuit thereof is connected through a switch 76 to the power source. The references 97', 98', 99' designate phototransistors which face the photodiodes 97, 98, 99 and turn on depending upon the luminescence of the corresponding photodiode; 77, 78, 79 designate inverters having output terminals $P_1$, $P_3$, $P_5$ which invert and amplify the outputs of the phototransistors 97', 98', 99'; 80, 81, 82 designate inverters having output terminals $P_4$, $P_6$, $P_2$ which input the outputs of the inverters 77, 78, 79; 83 designates a ring counter which is operated from the terminal $P_1$; to sequentially generate 7 outputs; 84 designates a frequency control device which inputs the output of the ring counter and the outputs $P_1$–$P_6$ to generate a low frequency output; 85 designates a turn-on control device for controlling the electrical angle of the elements 73; 86 designates a turn-on device; 100 designates a mode discriminating device which comprises one shot circuit for generating a ⌐H⌐ output for a certain time after changing the output $P_5$ from ⌐H⌐ to ⌐L⌐; an "and" gate which inputs the output of the one shot circuit and the output $P_1$ or $P_4$ and a flip-flop 90 which sets or resets the outputs of the "and" gates, the output being connected to the frequency control device 84.

Figure 16:
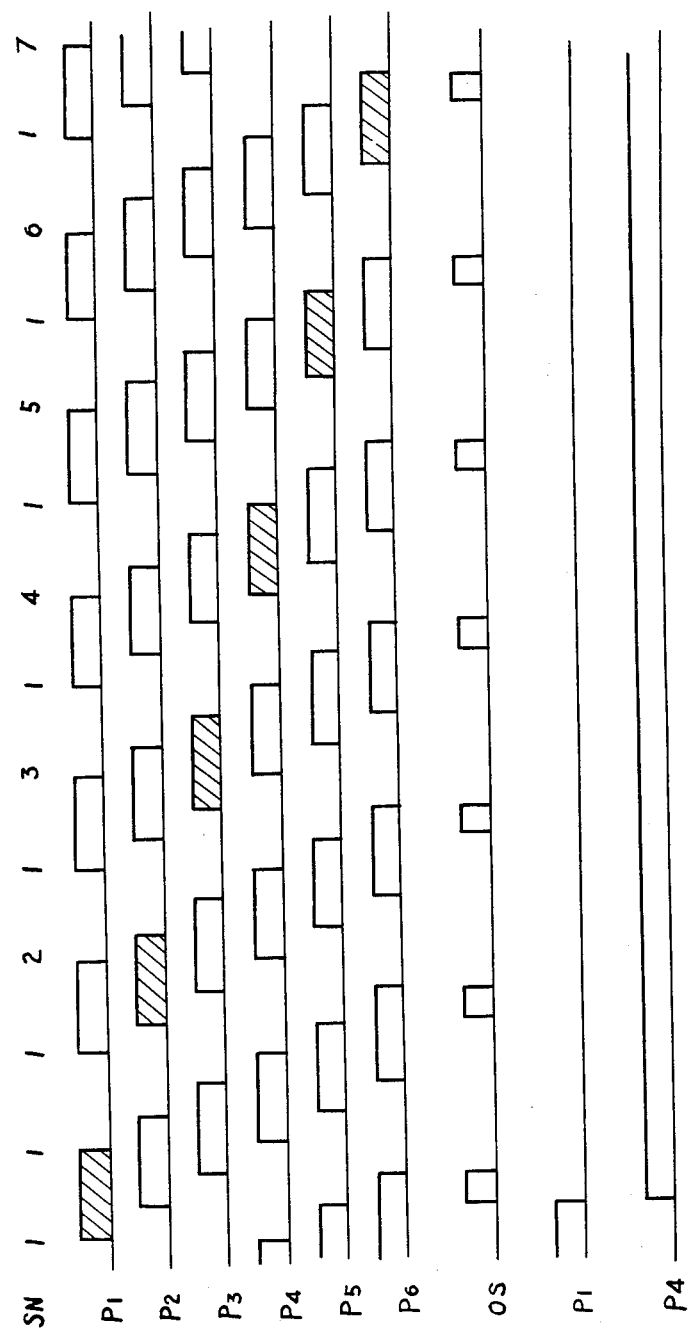
FIG. 16 is a diagram for showing the outputs at various parts in FIG. 15.

The operation of this embodiment will now be described. In the above-mentioned structure, the photodiodes 97, 98, 99 are sequentially actuated by the three phase power source 71 in the ON state of the contactor 74 and the switch 76 whereby the luminescence is intermittently given in a 120° phase difference. As a result, the outputs $P_1$–$P_6$ of the inverters 77–82 are as shown in FIG. 16 $P_1$–$P_6$. In the output of the ring counter 83, the output $P_1$ repeats 1–7 at each change from ⌐L⌐ to ⌐H⌐ as shown in FIG. 16 SN, the frequency control device 84 at the timing of the slant line part of FIG. 16. For example, when the output of the ring counter is 3, the switches 73 in the S phase and T phase are selected so as to apply the ST interphase voltage to the motor during connection of the photodiode 98 at the time that the output $P_3$ becomes ⌐H⌐. The 1/7 low speed operation is attained by this system.

When the selective turn-on system is modified, the $1/(6n \pm 1)$ (n=natural number) low speed operation can be attained. On the other hand, the output of the one shot circuit 87 operated by the output $P_5$ of the inverter 79 is shown in FIG. 16 OS. When the output is ⌐H⌐, the output $P_1$ is ⌐H⌐ and the output $P_4$ is ⌐L⌐. Accordingly, the flip-flop 90 is set and the frequency control device 84 is in the low speed operation mode as stated above. When the switch 76 is turned off, the luminescence of the photodiode 97 is stopped and the outputs $P_1$, $P_4$ of the inverters 77, 80 are given as shown in FIG. 16 $P_1'$, $P_4'$.

In this case, when the output of the one shot circuit 87 is ⌐H⌐, the output $P_1$ is ⌐L⌐ and the output $P_4$ is ⌐H⌐. Accordingly, the flip-flop 90 is reset and the frequency control device 84 is switched to a different control mode by the output. For example, the switches 73 in the R phase and T phase are turned on to conduct a DC excitation braking operation under the output $P_5$. In order to turn on the switches, the timing for turn-on of the switch is determined and then the electrical angle of the switch 73 is determined by the turn-on control device 85 and the turn-on is effected through the turn-on device 86.

As stated above, in accordance with this embodiment, one of the synchronizing signal generators is controlled by a switch and the phase detection is effected by the mode detecting device whereby the change of the control modes is attained. Accordingly, the interfaces between the output signal circuit and weak voltage logical circuit can be simplified and the stop operation can be controlled to prevent fluctuation of the low speed operation causing phase order difficulties caused by erroneous wirings even though the switches are in the ON state.

Another embodiment of the invention will now be described. FIG. 17 shows the speed of a load operated so as to improve the accuracy of a stop position for a predetermined position stopping device. FIG. 17(a) shows an operational pattern for a system correcting overrun to the predetermined position under a rather slow reverse operation; and FIG. 17(b) shows an operational pattern for a system approaching the predetermined position under a rather slow forward operation.

FIG. 18 shows an embodiment of the main circuit of the invention wherein the reference 102 designates controlled rectifiers such as thyristors which are respectively connected between the AC power source 101 and the motor 103.

FIG. 19 shows an apparatus for generating a turn-on signal of the thyristors 102. The reference 101 designates the AC power source; 103 designates the motor; 102 designates thyristors connected between the AC power source 101 and the motor 103. The reference 104 designates a control circuit which has the following structure. The reference 105 designates a phase detector for detecting the phase of the AC power source 101; 106 designates a counter connected to the phase detector 105 which comprises 13 progressive counters 106-1 for low speed forward operation and 11 progressive counters 106-2 for low speed reverse operation. The reference 108 designates an "and" circuit connected to the phase detector 105 and the counter 106; 107 designates a ring counter connected to the counter 106 and the "and" circuit 108; 109 designates an arithmetic circuit connected to the counter 106 and the ring counter 107; 110 designates an amplifier connected to the logical operation circuit 109 and the control electrode of the thyristors 102; 111 designates a speed command output part wherein LF designates low speed forward and LB designates low speed back and II designates high speed.

Figure 20:
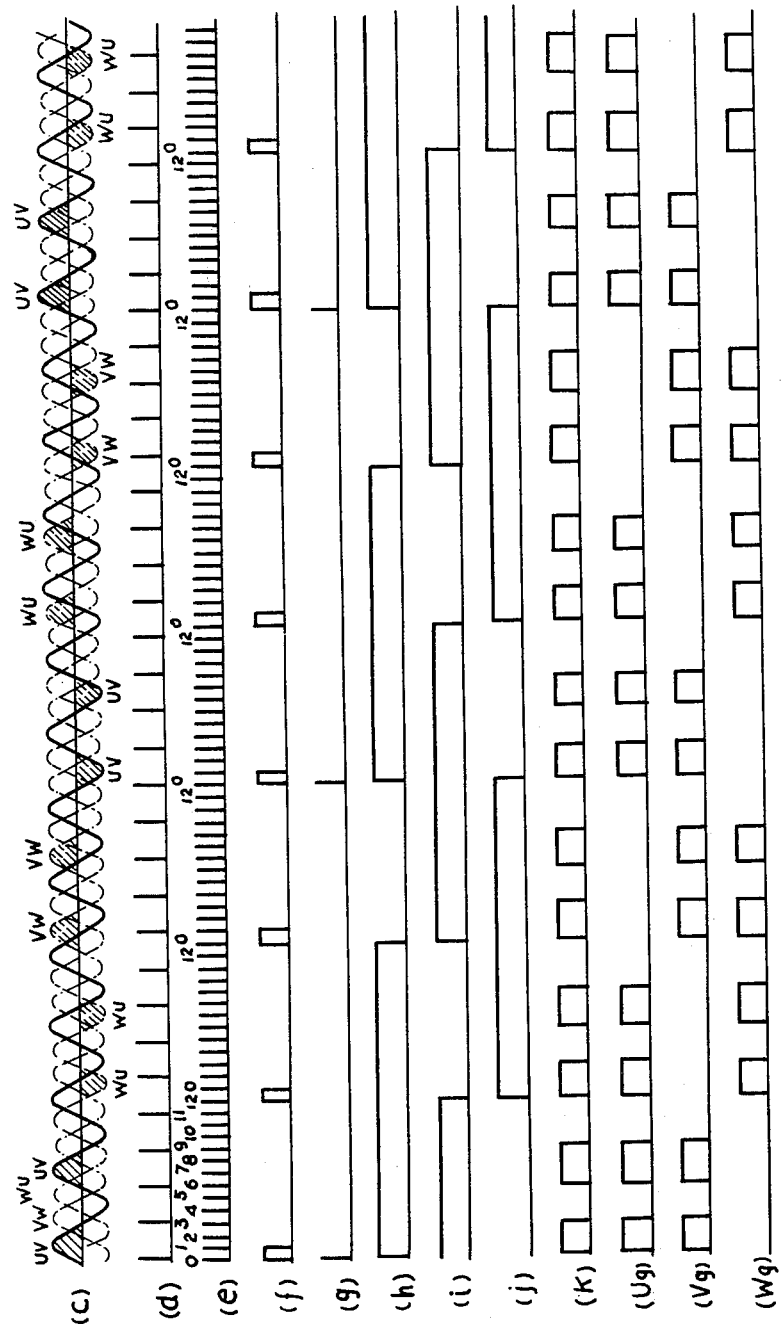
FIG. 20 shows pulses of the outputs of FIG. 19.

FIG. 20, shows wave forms at various parts of the block diagram of FIG. 19.

Figure 21:
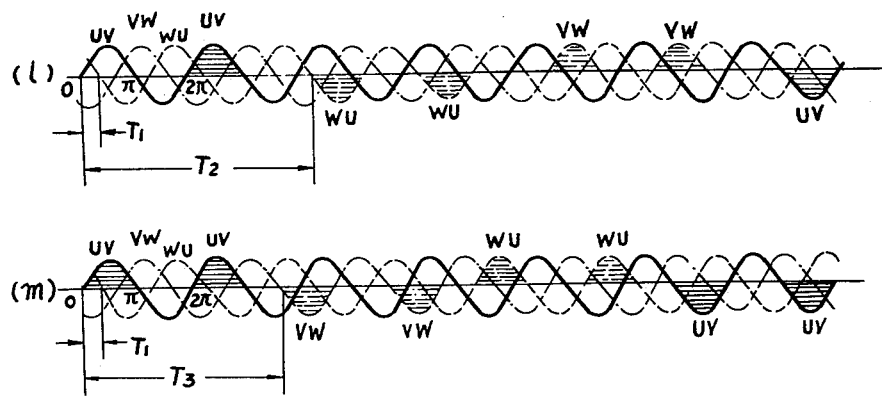
FIG. 21 shows voltages applied to the motor at low speed operation wherein (l) is for phase rotation the same as the phase of the power source and (m) is for phase rotation in reverse to the phase of the power source.

FIG. 21 shows wave forms of voltage applied to the motor. In FIG. 21(l), the interphase voltage is applied without delay at at the same times to the lines corresponding to the motor in positive order to the AC power source. In FIG. 21(m), the interphase voltage is applied without delay at the same times to the lines corresponding to the motor in negative order to the AC power source. (In FIG. 21, the slant line shading part indicates two times).

Figure 22:
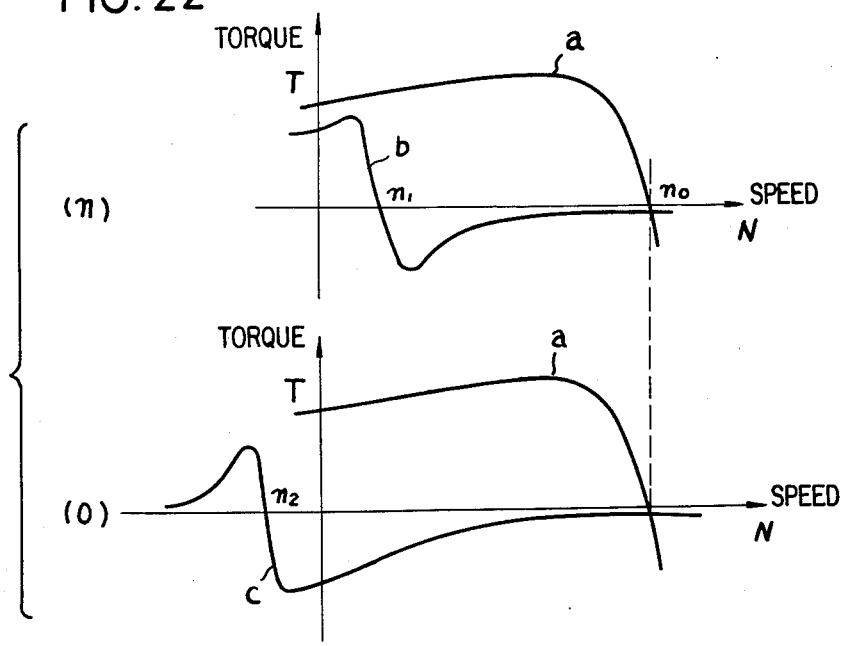
FIG. 22 shows the characteristics of the output of the motor.

FIG. 22 shows the motor output characteristics in the embodiment. In FIG. 19, when a high speed command is applied to the speed command part 111 to turn on all of the thyristors 102, the voltage of the AC power source 101 is directly applied to the motor 103 whereby the motor 103 is operated under the torque-speed characteristics of FIGS. 22(n), (o). In FIGS. 22(n), (o), the reference $n_0$ designates the synchronizing speed. When the thyristors 102 are turned on so as to apply only the interphase voltage shown by the slant line shading of FIG. 21 to the motor of FIG. 19, it is clear that the phase difference between adjacent interphase voltages, for example, the voltage between U and V or between U and W, is $T_1 = \pi/3$ when the period of the AC power source 101 is $2\pi$ in FIG. 21. On the other hand, the phase difference of adjacent interphase voltages in the case of turn-on only at the slant line shading of FIG. 21 is $T_2 = 4\pi + \pi/3 = 13/3\pi$ in FIG. 21(*l*). Accordingly, the following equation is realized $$f = f_i \cdot T_1/T_2 = 1/13 f_i$$

wherein the frequency of the AC power source 101 is fi and the output frequency in the system of FIG. 21(*l*) is f. On the other hand, the phase difference of adjacent interphase voltages of FIG. 21(*m*) is $T_3 = 3\pi + 2/3\pi = 11/3\pi$. Accordingly, the following equation is given.

$$fm = f_i \cdot T_1/T_3 = 1/11\pi$$

wherein the output frequency of the device is fm.

As stated above, when the thyristors 102 are controlled, an output having 1/13 of the frequency is given in the forward phase rotation to the AC power source in FIG. 21(*l*). On the other hand, an output having 1/11 of the frequency is given in reverse phase rotation to the AC power source in FIG. 21(*m*). The motor output characteristics are the characteristic b of FIG. 22(*n*) in FIG. 21(*l*) and the characteristic c of FIG. 22(*o*) in FIG. 21(*m*).

The embodiment for generating the signal for selectively turning on the thyristors 102 will now be described. FIG. 20(*c*) is a wave form for the interphase voltage of the AC power source 101. The slant line shading shows voltages which cause the selective turn on of the thyristors. When the phases of the AC power source 101 are designated as U, V, W, not shown, the pulse train generated at the time of 0 of the UV interphase voltage is shown in FIG. 20(*d*). The pulse train generated at the time of 0 of all interphase voltages of the AC power source 101 is shown in FIG. 20(*e*). The pulse trains (d), (e), are outputs of the phase detector 105 of FIG. 19. The counter 106-1 is reset in each 13th part of the pulse train (e) and has the outputs 1–13 (=0). The pulse train (f) indicates the output corresponding to 13 (=0), whereby the ring counter 107 is operated. A plurality of flip-flops, three flip-flops, are connected in annular shape in the ring counter 107. The outputs of the flip-flops are sequentially changed depending upon the input pulse. In this case, the ring counter 107 is set by the output pulse train (g) of the "and" circuit which inputs the pulse trains (d), (f). In this case, it is clear from FIG. 20 that the set pulse (g) is found in each three of the trigger pulses (f) by the ring counter 107. Accordingly, the ring counter 107 is set, synchronizing confirmation, in each period of the output. The outputs of the ring counter 107 are shown in FIGS. 20(*h*)–(*j*).

The pulse trains $U_g$–$W_g$ are logical products of the pulses (h)–(j) of the ring counter 107 during the forming of pulse trains so that the output pulse width is less than half the period of the AC power source 101 at the time corresponding to 0 and 6 among the outputs 1–13 of the counter 106. The logical operations are conducted in the logical operation circuit. The pulse trains $U_g$–$W_g$ correspond to the slant line shading of the wave form of the interphase voltages of the AC power source 101. It is believed clear from FIG. 20 that the pulse trains $U_g$–$W_g$ correspond to the interphase voltages. The pulse trains $U_g$–$W_g$ are sufficiently amplified for turn-on control of the thyristors 102 by the amplifier 110 of FIG. 19. As stated above, the operation of the control circuit 104 has been illustrated for providing the turn-on signal of the thyristors 102 so as to apply the interphase voltages shown by the slant line shading of FIG. 21(*l*) to the motor 103 on the positive wave and negative wave of the interphase voltages of the AC power source 101. It is believed clear that the same circuit can be used in the case where the interphase voltages shown by the slant line shading of FIG. 21(*m*) are applied to the motor.

This embodiment has been described according to the known characteristic of an induction motor in two type low speed operations. It is possible to apply the interphase voltages of the AC power source 101 for a desirable electrical angle so as to apply voltage corresponding to the frequency to the motor. The operation patterns of FIG. 17 can be attained in the above-mentioned structure by using the usual motor. When all of the thyristors 102 are in the ON state by the turn-on control of the control device 104, the torque-speed characteristics a of FIGS. 22(*n*), (*o*) can be obtained. When the turn-on control of FIG. 21(*l*) is conducted, the torque-speed characteristics b of FIG. 22(*n*) can be obtained. When the turn-on control of FIG. 21(*m*) is conducted, the torque-speed characteristics c of FIG. 22(*o*) can be obtained.

When the operation pattern of FIG. 17(*a*) is given, the motor shaft output characteristics are given as the torque-speed characteristics c of FIG. 22(*o*) by switching from the all turn-on state of the thyristors 102 by the high speed command output signal $H_j$ of the speed command device 111 to the selective turn-on state of FIG. 21(*m*) by the low speed reverse output signal LB of the speed command device 111 at $t_1$ of FIG. 17. Accordingly, the motor assumes low speed reverse operation.

On the other hand, in the operation pattern of FIG. 17(*b*), the motor shaft output characteristics are changed from the characteristics a to c of FIG. 22(*n*) by switching from the full turn-on state to the selective turn-on state of FIG. 21(*l*) by the low speed forward output signal LF of the speed command devices 111 at $t_2$ of FIG. 17.

In accordance with the embodiment, the usual motor which has excellent maintenance properties can be used without a speed change gear, a brake and a clutch only with simple control apparatus. Moreover, the structure of the apparatus is quite simple and is miniaturized to be economical.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A speed control apparatus comprising:
   (1) switch means for use during high speed operation disposed between a three phase AC power source and a motor;
   (2) switch means for use during low speed operation disposed between the AC power source and the motor and including at least one semiconductor switch for each phase and a plurality of phase connection contactors;
   (3) low speed control means for controlling turn-on and off of the semiconductor switch by generating a $1/(6n \pm 1)$ frequency dividing turn-on pulse wherein n is an integer, the control means including
      (a) a plurality of synchronizing signal generators connected to the phases of the power source;

(b) a ring counter operated by one of the synchronizing signals;
(c) frequency control means for logically processing the synchronizing signals and the output of the ring counter to generate a low frequency output; and
(d) turn-on control means responsive to the low frequency output for generating the turn-on signal of the semiconductor switch;
(4) speed reduction switch means for switching the motor from high speed to low speed; and
(5) switch control means for shifting the phase connection order in the high speed and the phase connection order in the low speed.

2. The speed control apparatus recited in claim 1 including:
(6) braking command means for applying a braking command to the synchronizing signal generators;
(7) memory means for memorizing the turn-on signal data for the semiconductor switch just before application of the braking command; and
(8) excitation turn-on means for applying the turn-on signal only to the semiconductor switch corresponding to the memorized signal data of the memory device.

3. A speed control apparatus comprising:
(1) switch means for use during high speed operation disposed between a three phase AC power source and a motor;
(2) switch means for use during low speed operation disposed between the AC power source and the motor and including at least one semiconductor switch for each phase and a plurality of phase connection contactors;
(3) low speed control means for controlling turn-on and off of the semiconductor switch by generating a $1/(6n \pm 1)$ frequency dividing turn-on pulse wherein n is an integer, the control means including
(a) a plurality of synchronizing signal generators connected to the phases of the power source;
(b) a ring counter operated by one of the synchronizing signals;
(c) frequency control means for logically processing the synchronizing signals and the output of the ring counter to generate a low frequency output; and
(d) turn-on control means responsive to the low frequency output for generating the turn-on signal of the semiconductor switch;
(4) high speed-low speed switching means for braking one of the synchronizing signal generators; and
(5) a mode detector for detecting the turn-off of one of the synchronizing signal generators to control the frequency control means so that the frequency control means is controlled by the output signal of the mode detector to change the control mode of the switches.

* * * * *